US012424199B2

(12) United States Patent
Swvigaradoss et al.

(10) Patent No.: US 12,424,199 B2
(45) Date of Patent: Sep. 23, 2025

(54) DYNAMIC TRANSLATION FOR A CONVERSATION

(71) Applicant: ServiceNow, Inc., Santa Clara, CA (US)

(72) Inventors: Jebakumar Mathuram Santhosm Swvigaradoss, Hyderabad (IN); Satya Sarika Sunkara, Sangareddy (IN); Ankit Goel, Hyderabad (IN); Rajesh Voleti, Allur (IN); Rishabh Verma, Palwal (IN); Patrick Casey, Del Mar, CA (US); Rao Surapaneni, San Jose, CA (US)

(73) Assignee: ServiceNow, Inc., Santa Clara, CA (US)

( * ) Notice: Subject to any disclaimer, the term of this patent is extended or adjusted under 35 U.S.C. 154(b) by 6 days.

(21) Appl. No.: 18/414,216

(22) Filed: Jan. 16, 2024

(65) Prior Publication Data

US 2024/0153487 A1    May 9, 2024

Related U.S. Application Data

(63) Continuation of application No. 16/883,768, filed on May 26, 2020, now Pat. No. 11,908,450.

(51) Int. Cl.
*G10L 13/08* (2013.01)
*G06F 40/274* (2020.01)
(Continued)

(52) U.S. Cl.
CPC .......... *G10L 13/086* (2013.01); *G06F 40/274* (2020.01); *G06F 40/58* (2020.01); *G10L 15/005* (2013.01)

(58) Field of Classification Search
CPC ....... G10L 13/08; G10L 15/00; G06F 40/274; G06F 40/58
See application file for complete search history.

(56) References Cited

U.S. PATENT DOCUMENTS 9,747,282 B1 *   8/2017   Baker ................... G06F 40/58
10,992,604 B1 *  4/2021   Knas .................. H04L 65/1069
(Continued)

OTHER PUBLICATIONS

Tina Sieber. "Can Skype Translator really help you converse in any language? We tested to see". Digital Trends. Feb. 7, 2015.

*Primary Examiner* — Olujimi A Adesanya
*Assistant Examiner* — Ethan Daniel Kim
(74) *Attorney, Agent, or Firm* — McDonnell Boehnen Hulbert & Berghoff LLP

(57) ABSTRACT

Data indicative of one or more user inputs directed to a user interface of a conversation designer tool is received. A conversation design is determined based on the data. The conversation design enables a conversation bot to provide a service using a conversation flow specified at least in part by the conversation design. The conversation design specifies in a first human language at least a portion of a message content to be provided by the conversation bot during an execution of the conversation flow. It is identified that an end-user of the conversation bot prefers to converse in a second human language different from the first human language. The message content of the conversation design in the first human language is dynamically translated for the end-user to the second human language.

20 Claims, 10 Drawing Sheets

(51) Int. Cl.
*G06F 40/58* (2020.01)
*G10L 15/00* (2013.01)

(56) References Cited

U.S. PATENT DOCUMENTS

| | | | |
|---|---|---|---|
| 11,068,669 B2 | 7/2021 | Malcangio | |
| 11,146,598 B1* | 10/2021 | Palihakkara | H04L 51/02 |
| 11,153,234 B2 | 10/2021 | Wu | |
| 11,153,235 B1* | 10/2021 | Dalonzo | H04L 51/56 |
| 11,164,562 B2* | 11/2021 | DiMascio | G10L 15/063 |
| 11,385,916 B2 | 7/2022 | Swvigaradoss | |
| 11,392,768 B2 | 7/2022 | Goel | |
| 11,580,312 B2 | 2/2023 | Santo | |
| 11,727,213 B2 | 8/2023 | Swvigaradoss | |
| 12,142,275 B2 | 11/2024 | Swvigaradoss | |
| 12,197,435 B2 | 1/2025 | Swvigaradoss | |
| 2006/0116877 A1* | 6/2006 | Pickering | G10L 15/08 704/231 |
| 2009/0006083 A1* | 1/2009 | Bachand | G10L 15/22 704/201 |
| 2012/0253782 A1* | 10/2012 | Ariga | G06F 40/58 704/2 |
| 2013/0166275 A1* | 6/2013 | Yang | G06F 40/58 704/2 |
| 2016/0048841 A1* | 2/2016 | Johnson | G06Q 30/015 705/304 |
| 2016/0350290 A1* | 12/2016 | Fujiwara | G06F 40/51 |
| 2017/0279906 A1* | 9/2017 | Laird-McConnell | H04L 67/10 |
| 2019/0294394 A1* | 9/2019 | Oikawa | G06F 3/1228 |
| 2019/0347668 A1* | 11/2019 | Williams | G06F 18/2413 |
| 2020/0035234 A1* | 1/2020 | Aarabi | G06N 3/088 |
| 2021/0082419 A1* | 3/2021 | Tran | G09B 7/00 |
| 2021/0184995 A1* | 6/2021 | Jones | G06F 40/58 |
| 2021/0203768 A1* | 7/2021 | Dupre | H04W 4/90 |
| 2021/0288925 A1* | 9/2021 | Tagra | H04L 51/04 |
| 2021/0327413 A1* | 10/2021 | Suwandy | G06N 3/045 |
| 2021/0335365 A1* | 10/2021 | Aharoni | H04M 3/5158 |
| 2021/0357378 A1* | 11/2021 | Urdiales | G06N 3/08 |

* cited by examiner

FIG. 3C

DYNAMIC TRANSLATION FOR A CONVERSATION

CROSS REFERENCE TO OTHER APPLICATIONS

This application is a continuation of U.S. patent application Ser. No. 16/883,768 entitled DYNAMIC TRANSLATION FOR A CONVERSATION filed May 26, 2020 which is incorporated herein by reference for all purposes.

BACKGROUND OF THE INVENTION

Automated bots can be used to provide automated assistance and service to end-users. For example, bots can be used to provide customer service or provide IT help by having the user converse with the bot. An end-user/requestor is able to converse (e.g., via text or voice conversation) with the bot in real-time to ask for and obtain desired information or service. Because bots are automated, bots can be deployed with minimal overhead, allowing a reduction in the volume of requests handled by live agents. Bots can be configured and designed for a specific use case or service. For example, a designer specifies conversation prompts and responses to be provided by the bot as well as actions taken by the bot.

BRIEF DESCRIPTION OF THE DRAWINGS

Various embodiments of the invention are disclosed in the following detailed description and the accompanying drawings.

FIG. 3C shows an example user interface of a conversation designer tool utilized to specify properties of a request for a static choice response.

DETAILED DESCRIPTION

Figure 1:
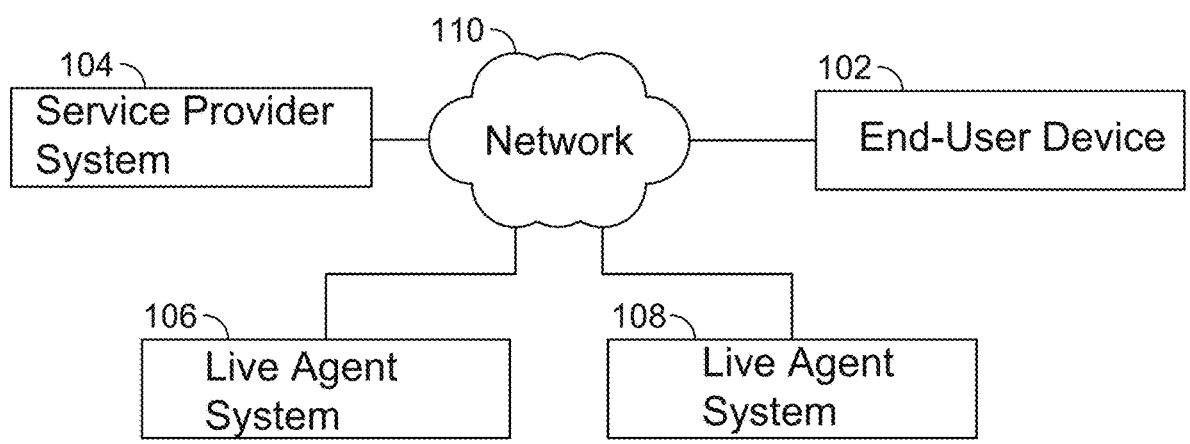
FIG. 1 is a diagram illustrating a virtual agent deployment environment. Service provider system 104 provides an automated bot service to an end-user using end-user device 102.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Examples of a conversation bot include a virtual agent, a chatbot, an interactive voice response bot, or any other automated agent configured to interact or converse with a human end-user using human language. Conversation bots are typically designed and configured to converse in a specific language. For example, a designer of a conversation capability of a conversation bot typically designs and configures conversation prompts and responses in a native natural/human language of the designer. However, this makes bots not useful for an end-user that cannot speak the native language of the designer. Another designer can create another version of the conversation capability of the bot in a different language, but this takes valuable effort and resources that often cannot be afforded for every possible language.

In some embodiments, a conversation output of a bot designed in one natural/human language is automatically translated to a preferred natural/human language of an end-user. This allows an existing specification of a conversation capability of a bot in one language to be utilized for various other languages without requiring the designer to specify the conversation/message outputs of the bot in the different languages. For example, a specification of messages able to be outputted by a bot has been specified by a designer in a first human language. When it is determined that an end-user of the bot prefers to converse in a second human language different from the first human language, the conversation output to be provided by the bot is automatically translated for the end-user from the first human language to the second human language.

FIG. 1 is a diagram illustrating a virtual agent deployment environment. Service provider system 104 provides an automated bot service to an end-user using end-user device 102. Live agent system 106 is utilized by a live human agent to communicate with a user of end-user device 102 in the event a human agent support is needed (e.g., hand off from bot to a live agent). Live agent system 108 is utilized by a second live human agent that may also participate in a three-way conversation between the user of end-user device 102 and the live human agent of live agent system 106. For example, the second live human agent may serve as a supervisory live agent or a complementary live agent to the live agent using live agent system 106.

Service provider system 104, end-user device 102, live agent system 106, and live agent system 108 are connected via network 110. Examples of network 110 include the Internet, local area network, wide area network, cellular network, wireless network, personal area network, etc. The number of components shown in FIG. 1 has been simplified to illustrate the embodiment clearly. Any number of components shown in FIG. 1 or not shown in FIG. 1 may exist in various embodiments. A component shown in FIG. 1 may represent multiple physical devices. In some embodiments, one or more of components shown in FIG. 1 are not required.

A conversation bot provided by service provider system 104 converses with a user of end-user device 102 to provide information and/or services. Service provider system 104 provides a platform for providing user assistance through conversations within a messaging and/or voice interaction interface. An organization can design and build automated conversation capabilities that help end-users quickly obtain information, make decisions, and perform common work tasks. End-user device 102 accesses a client interface to interact with the conversation bot of service provider system 104, a live agent of live agent system 106, and/or a live agent of live agent system 108. The client interface may be a web-based interface or an application-based (e.g., mobile application) interface.

The conversation bot provides an end-to-end conversational experience to provide information and resolve user requests by taking text or voice chat from conversation to resolution. The conversation bot provides machine generated conversation prompts and provides responses in response to the provided conversation inputs from end-users. The conversation capabilities (e.g., messages able to be provided) of conversation bots provided by service provider system 104 were designed using a designer tool that can be used to develop, test, and deploy automated conversations that assist users with common issues or self-service tasks. The designer tool may be a graphic tool for building the dialog flows of conversations, called topics. A topic defines the dialog exchanged between a conversation bot and an end-user to accomplish a specific goal or resolve an issue. A designer may build conversations that are based on keywords that users enter, or, Natural Language Understanding (NLU) models may be applied, which enables the bot to understand, process, and respond to end-user inputs during a conversation.

In some embodiments, during a conversation with a conversation bot, an end-user is able to switch to a live human agent of live agent system 106 for assistance. The conversation bot integrates with a live chat interface to offer a seamless transfer from the bot to a live agent. Users may request a live agent transfer during a bot conversation. A live agent transfer may also be initiated through specified custom conversation flows.

Implementing a conversation bot to handle requests and tasks enables users to get immediate help, day or night. Providing conversation bots on channels familiar to users, such as third-party messaging apps, offers a convenient way for them to get work done quickly. A conversation bot can also offer personalized customer experiences by applying and remembering end-user information during the conversation. Example support tasks that conversation bots can provide include:

Answering FAQs
  Providing tutorial ("how to") information
  Querying or updating records, for example, to get status on cases or incidents
  Gathering data, such as attachments, for the live agent
  Performing diagnostics
  Resolving multi-step problems Automating these support tasks with a conversation bot frees live support agents to focus on more complex user issues and enables scaling of support organization accordingly.

An example simple conversation with a conversation bot includes the following elements:

Default welcome message from the conversation bot, followed by the first prompt for the conversation. The initial prompt asks the end-user to input a question or to choose from a list of available topics.
  End-user response to the first prompt. In an example, the end-user chooses the topic for checking an IT ticket.
  Series of prompts, acknowledgements, and responses exchanged between the conversation bot and the end-user until the end-user reaches a desired goal or completes a desired task. Different rich controls may be utilized in bot prompts, for example, choice lists with buttons or a carousel of images to select an item.
  Closing message to end the conversation.

In some embodiments, a conversation bot provided by service provider system 104 was designed and configured by a human designer to provide conversation messages in a specified human language. However, if an end-user desires to converse with the conversation bot (e.g., receives information and prompts and provides responses) in a preferred language that is different from the specified human language, servicer provider system 104 automatically translates the conversation message outputs of the conversation bot specified in the original language to the preferred language of the end-user. This allows an existing specification/design of messages of the conversation bot in one language to be utilized for various other languages without requiring the designer to specify the message outputs of the conversation bot in the different languages.

Figure 2:
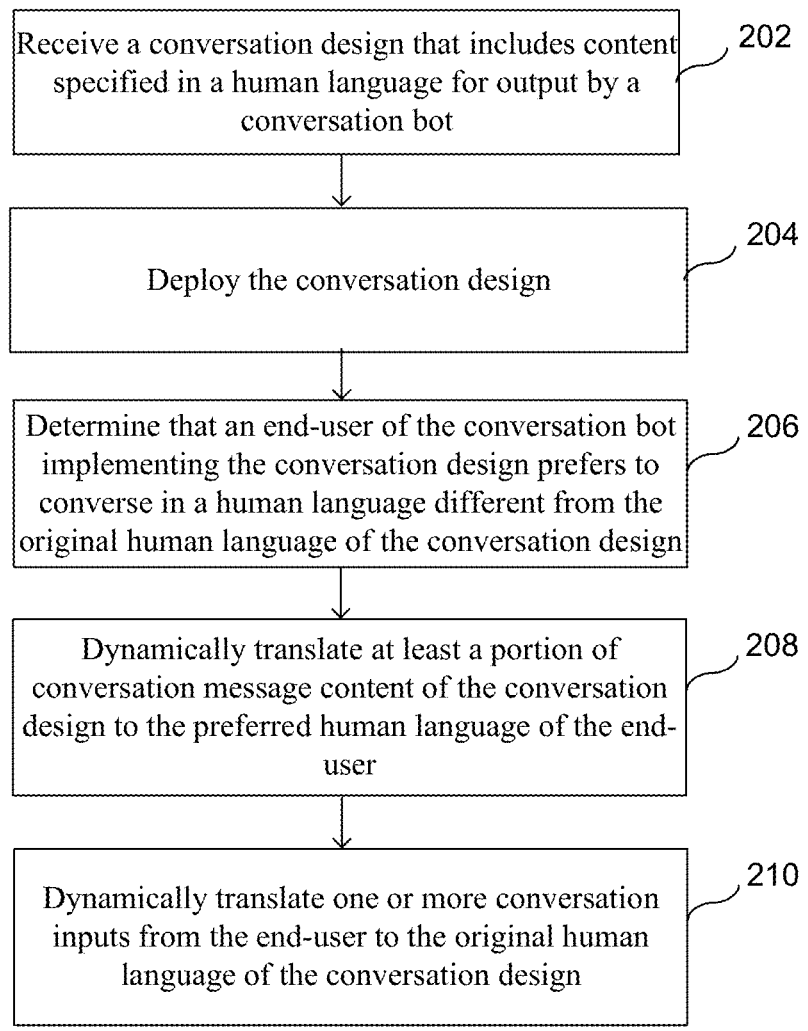
FIG. 2 is a flowchart illustrating an embodiment of a process for automatically translating a bot conversation.

FIG. 2 is a flowchart illustrating an embodiment of a process for automatically translating a bot conversation. The process of FIG. 2 may be at least in part implemented on service provider system 104 of FIG. 1.

At 202, a conversation design that includes content specified in a human language for output by a conversation bot is received. In some embodiments, the conversation design has been specified by a human designer using a conversation designer tool/program/solution.

The conversation design (e.g., conversation topic design) specifies configuration and message content that enables a conversation bot to handle a conversation with an end-user with respect to a specific conversation topic handling capability being enabled by the conversation design. For example, the conversation design specifies the conversation flow, conversation message content, prompts, information, and/or logic, etc. needed to enable the conversation bot to converse with an end-user to provide a service for a specific conversation topic being enabled by the conversation design. A conversation bot can be configured to handle many different conversation topics and associated services enabled by many different conversation designs. Additional conversation topic handling capabilities (e.g., to provide additional services) can be enabled by specifying corresponding additional conversation designs for the conversation bot.

In some embodiments, the conversation design includes a collection of elements of a specified conversation topic flow. These elements can be used to collect, process, and present information to users. These elements can also read, create, and update records on an instance. Each set of elements performs specific functions in a conversation flow. One category of elements is a "bot response" element type that controls responses of the conversation bot in a conversation. Another category of elements is a "start segment" element type that can be configured with a greeting response that appears when a conversation begins. Another category of elements is an "end segment" element type that can be configured with a final confirmation message before the end of a conversation. Another category of elements is a "user input" element type that can be used to prompt and capture information from the user in a conversation. Another category of elements is a "utilities" element type that can be used to handle actions and logic within a topic, such as running a script or adding different conversation paths (e.g., branches) in a topic. Any of these element types may require the designer to specify the exact conversation message to be provided. The user can specify the conversation in a chosen (e.g., native) language of the user.

Figure 3A:
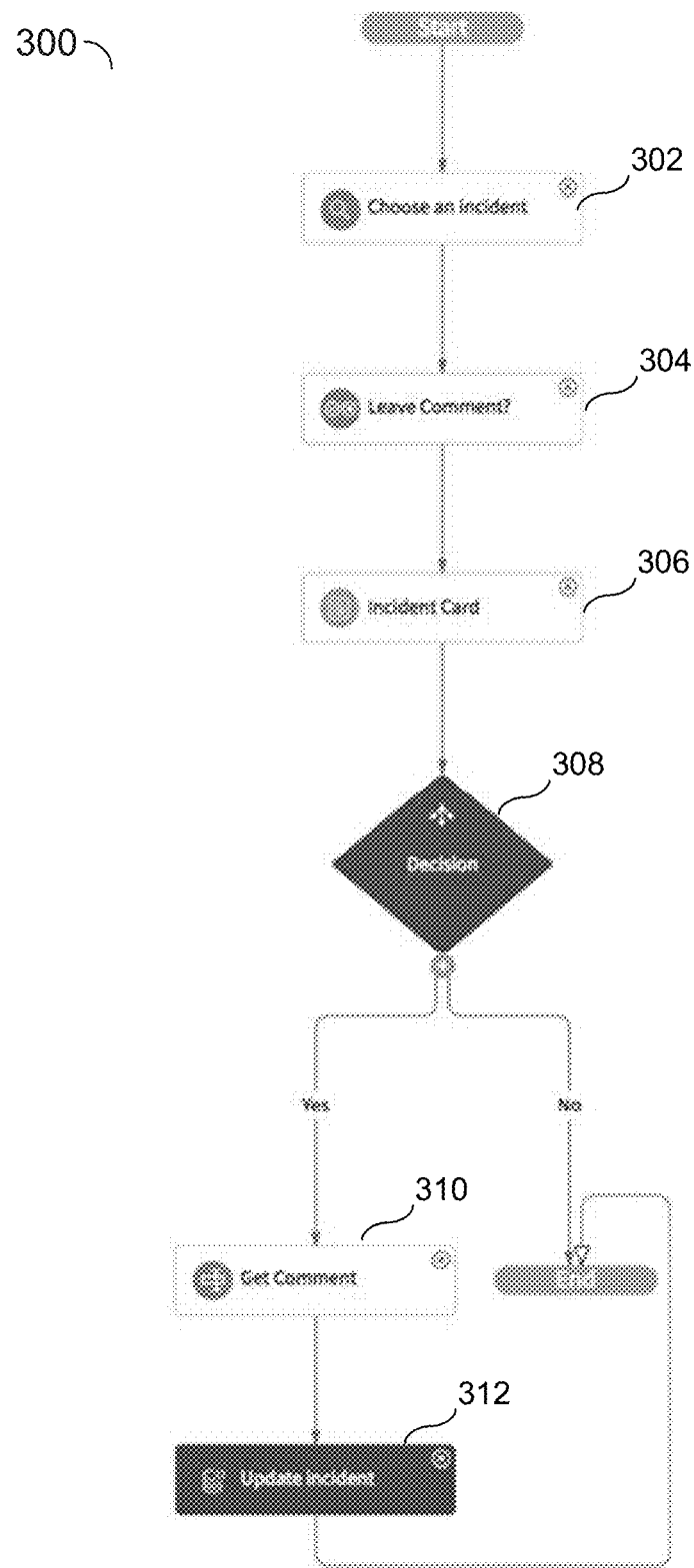
FIG. 3A shows an example of a visualization of a conversational flow of a conversation design that a designer can specify using a user interface of a conversation designer tool.

In an example, a designer is a provided tool for creating and managing conversation designs/topics (e.g., blueprints for conversations between a conversation bot and a user). The designer can design conversation designs/topics that provide services to help end-users resolve common issues or guide them through self-service tasks. FIG. 3A shows an example of a visualization of a conversational flow of a conversation design that a designer can specify using a user interface of a conversation designer tool. As shown in conversation flow 300 of FIG. 3A, element 302 represents a prompt for an end-user to select an incident. Element 304 represents a prompt to ask if the end-user wants to leave a comment. Element 306 represents an output showing the status of the incident. Element 308 represents a utility control to branch the conversation on that answer. Element 310 represents a prompt for the end-user to enter a comment. Element 312 represents a utility control to add the end-user input as a comment in the incident. As shown in this example of FIG. 3A, various conversation prompts and outputs need to be specified by the designer. With the dynamic and automatic translation that can take place later, the designer can specify the conversation message content in the human language of choice for the designer without needing to explicitly provide several different versions for different human languages. Additionally, conversation inputs provided by the end-user can also be translated to allow understanding, logic, and control branches of the conversation design/flow to function properly as designed.

There exists a variety of conversation message content that a designer can specify for the conversation design. This conversation message content can be specified in a specific preferred language of the designer and can be later translated to a language of choice for the end-user during execution of the conversation bot to allow the specification of the conversation bot specified in the specific single language to be utilized to provide the conversation bot service in other conversation languages. For example, a designer can specify in text the message content to be displayed and/or voice-synthesized in one language and this message content can be dynamically translated to any one of a plurality of different languages automatically as needed. Other content in the conversation such as labels and default messages may also be automatically translated to the various different corresponding preferred languages of end-users as needed when presented by the conversation bot to the end-users.

Figure 3B:
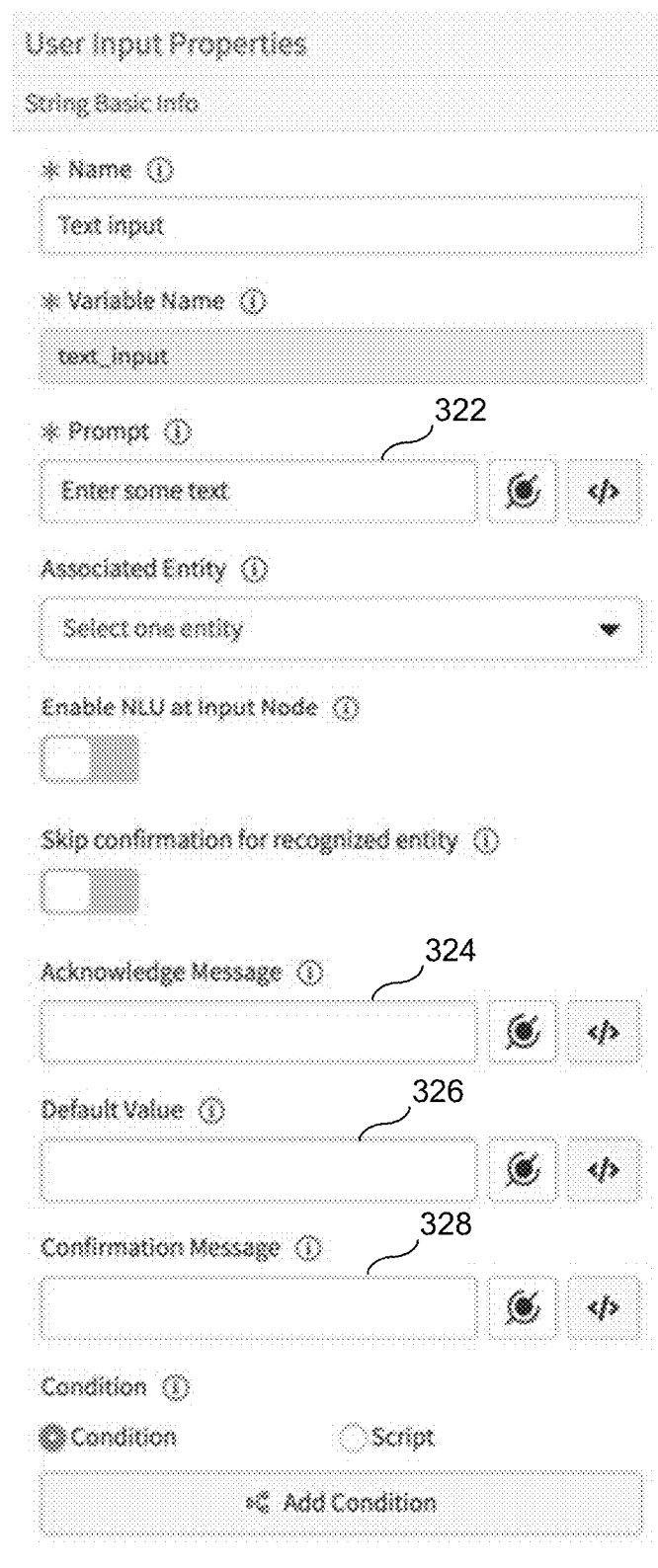
FIG. 3B shows an example user interface of a conversation designer tool utilized to specify properties of a request for a text response.

In addition to specification of information content that is to be provided (e.g., via text or synthesized voice) by the conversation bot, the designer is also able to specify conversation message content that prompts for a response from the end-user. One type of input that can be prompted from an end-user by a conversation bot is a free form text or spoken response. FIG. 3B shows an example user interface of a conversation designer tool utilized to specify properties of a request for a text response. In box 322, a designer may specify the conversation message content (e.g., text or script that returns text of prompt or question) to be provided to an end-user to request a response. In box 324, a designer may specify the conversation message content (e.g., text or script that returns text of prompt or question) to be provided to an end-user in acknowledging the user input. In box 326, a designer may specify a predefined value for an end-user input in response to the request for a response. In box 328, a designer may specify the conversation message content (e.g., text or script that returns text of prompt or question) to be provided that verifies the default or single-choice selection made by an end-user. The designer is able to specify the conversation message content in boxes 322-328 in a single human language, and the content in these boxes may be dynamically translated to various different corresponding preferred languages of end-users as needed when presented by the conversation bot to the end-users. This simplifies the design phase of the conversation bot because the various different translations to different languages do not need to be manually specified by the designer.

Figure 3C:
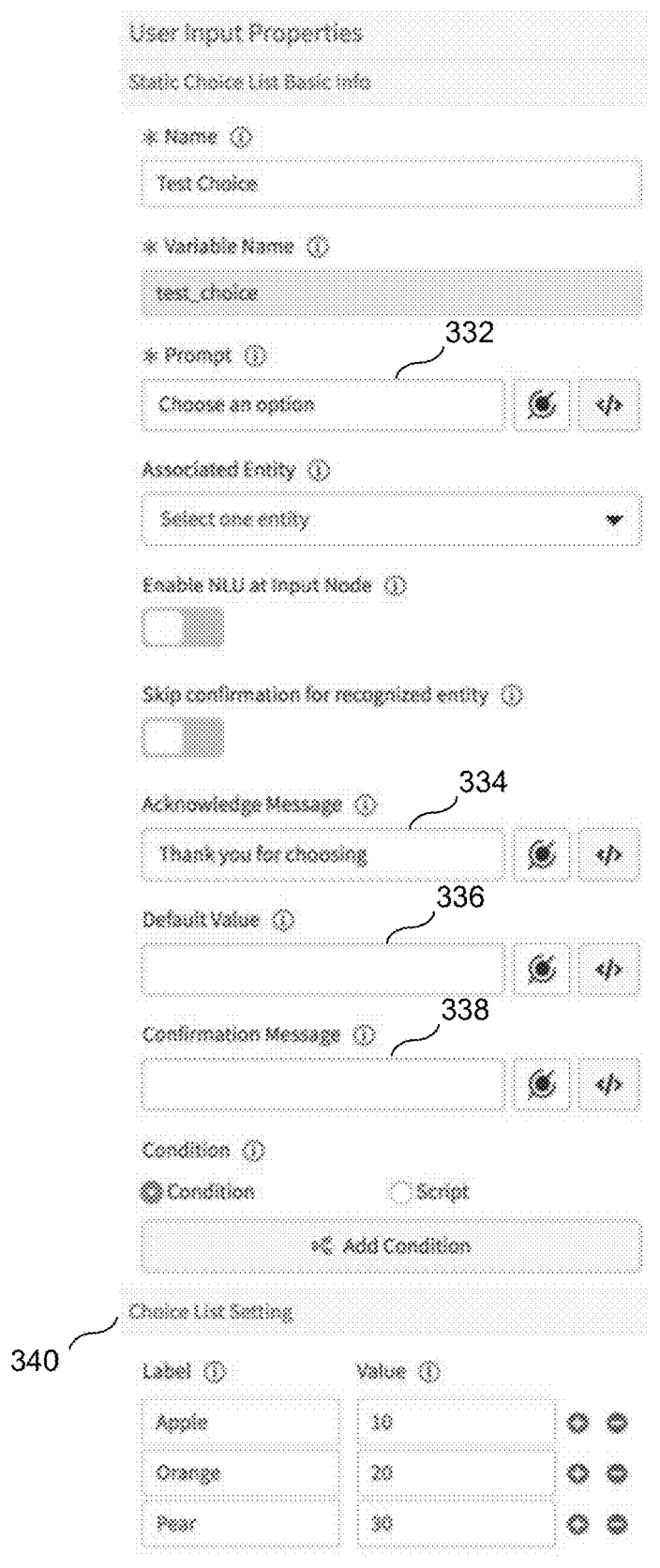

Another type of input that can be prompted from an end-user by a conversation bot according to the conversation design is a static choice response. For example, the conversation bot lists predefined choices and an end-user can select one item from the choice list. FIG. 3C shows an example user interface of a conversation designer tool utilized to specify properties of a request for a static choice response. In box 332, a designer may specify the conversation message content (e.g., text or script that returns text of prompt or question) to be provided to an end-user to request a static choice response. In box 334, a designer may specify the conversation message content (e.g., text or script that returns text of prompt or question) to be provided to an end-user in acknowledging the user input. In box 336, a designer may specify a predefined value for an end-user input in response to the request for a response. In box 338, a designer may specify the conversation message content (e.g., text or script that returns text of prompt or question) to be provided that verifies the default or single-choice selection made by an end-user. The designer is able to specify the conversation message content in boxes 332-338 only in a single language, and the content in these boxes may be dynamically translated to various different corresponding preferred languages of end-users as needed when presented by the conversation bot to the end-users. In the boxes of choice list setting 340, the designer lists the predefined choices of the static choice response. For each choice, a designer specifies a "Label" and a "Value." The "Label" is the text that appears to the end-user for that choice. The "Value" is a string that is stored in the variable when that choice is selected. In some embodiments, the content in the "Label" boxes may be dynamically translated to various different preferred languages of end-users as needed when presented by the conversation bot to the end-user.

Another type of input that can be prompted from an end-user by a conversation bot according to the conversation design is a reference choice response. For example, the conversation bot lists choices that are dynamically generated by querying a table or by using a script to dynamically create them and an end-user can select an item from the dynamically generated choice list. In some embodiments, the content to be displayed by the conversation bot in the dynamically generated choice list may be dynamically translated to various different corresponding preferred languages of end-users as needed when presented by the conversation bot to the end-users.

Another type of input that can be prompted from an end-user by a conversation bot according to the conversation design is a Boolean response. In some embodiments, the "Yes" and "No" (or "True" and "False") options to be displayed by the conversation bot are dynamically translated to various different corresponding preferred languages of end-users as needed when presented by the conversation bot to the end-users.

Another type of input that can be prompted from an end-user by a conversation bot according to the conversation design is a date/time response. For example, the conversation bot requests and receives a selection of a specification of a calendar date, time (hours and minutes), or both from the end-user. In some embodiments, the labels and/or format of a date/time selector (e.g., month, day of week, format of calendar, date format, time format, etc.) provided by the conversation bot is dynamically translated to a version corresponding to a preferred language of an end-user when presented by the conversation bot to the end-user.

Another type of input that can be prompted from an end-user by a conversation bot according to the conversation design is a carousel input type response. For example, the conversation bot requests and receives a selection choice among provided option choices, each option choice having an image and a corresponding text description. Any of the text descriptions of the option choices may be dynamically translated to a version corresponding to a preferred language of an end-user when presented by the conversation bot to the end-user.

Additionally because designer/programmer specified underlying logic and flow of the conversation bot may expect responses from the end-user to be in the original natural/human language as specified by the designer/programmer, a received response from the end-user is also automatically translated back to the original natural/human language before being passed for use in the underlying logic and flow of the conversation design.

In some embodiments, an end-user may access the conversation bot via a visual interface (e.g., text conversation, etc.) and/or an audio interface (e.g., spoken speech interface, telephone call, etc.), and the designer is able to specify in the conversation design a different content for text display and a different content for audio speech output for the same message to be provided by the conversation bot. For example, the desired spoken expression may differ from the desired written expression to convey similar meaning due to differences in the expression mediums (e.g., different message content in different expression mediums that complement each other may be desired). In one or more user interface input boxes of the conversation designer tool, the designer may specify a version of the conversation message content to be provided in the event a text message is to be provided and a different version of the conversation message content to be provided in the event a voice message is to be provided. For example, in a user interface box where the conversation message content to be provided to an end-user is to be specified, the designer is able to input both versions by first providing a version of the conversation message content for a text message, followed by a separator identifier (e.g., "###") and then a version of the conversation message content for a voice message (e.g., "Please select an option from list below ### Please select one of the options"). In an alternative embodiment, there exists a field where a version of the conversation message content for a text message can be provided and another separate corresponding field where a version of the conversation message content for a voice message can be provided.

Returning to FIG. 2, at 204, the conversation design is deployed. Deploying the conversation design includes enabling the conversation design to be utilized to provide a conversation bot service that is able to handle a service enabled by the conversation design. For example, the conversation design enables a conversation bot to converse with an end-user regarding a certain topic and the conversation design is allowed to be utilized by the conversation bot service to provide the conversation and service enabled by the conversation design. In some embodiments, the conversation design is one of a plurality of conversation designs that have been enabled for the same conversation bot and each of the different conversation designs enables a different conversation topic/service for the conversation bot. A specific conversation design among many conversation designs may be invoked by an end-user when the end-user requests a specific service or initiates a conversation corresponding to the specific conversation design. For example, a natural language understanding component of the conversation bot may detect that a conversation input from the end-user (e.g., detected keywords) corresponds to a conversation topic of a specific conversation design and executes/follows the specification of the specific conversation design. In some embodiments, the conversation bot utilizing the conversation design is executed on one or more servers and/or cloud computing solution and services accessible by end-users. An end-user may be able to access the conversation bot via a text chat interface and/or a voice interface.

At 206, it is determined that an end-user of the conversation bot implementing the conversation design prefers to converse in a human language different from the original human language of the conversation design. For example, conversation message content of the conversation design to be provided to the end-user was specified in the English language but the end-user may prefer to converse in French. In some embodiments, the determination of user language preference is made based on a profile information and/or other stored preferences of the end-user. For example, the end-user may have specified a preferred language in a stored user profile. In some embodiments, the determination of user language preference is made based on a detected location of the end-user. For example, a location information of the end-user is detected (e.g., based on IP address, provided location coordinate, stored location in a user profile, etc.) and a most common, default, and/or national language corresponding to the location is determined as the preferred language of the end-user. In some embodiments, the determination of user language preference is made based on conversation message content of the end-user. For example, the end-user may indicate during a conversation with the conversation bot that the end-user prefers to converse in a specified language or that the end-user doesn't understand or speak the current language being utilized by the bot (e.g., in response the bot may ask the end-user for a preferred language). In some embodiments, a preferred language of the end-user is automatically detected by analyzing a message content provided by the end-user in the preferred language (e.g., using a language detection service).

At 208, at least a portion of conversation message content of the conversation design is dynamically translated from the original human language of the conversation design to the preferred human language of the end-user. For example, when the conversation agent is to provide a conversation message output in a conversation with the end-user (e.g., provide information, provide prompt, ask question, etc.) as specified in the conversation design, the corresponding conversation message content (e.g., specified text/voice content to be provided to the end-user) is dynamically translated from its originally specified language (e.g., as specified by the designer) to the preferred language of the end-user. The dynamic nature of the translation allows the translation to be performed as needed (e.g., in response to a determination that the message content is to be provided by the conversation bot to the end-user). In some embodiments, the conversation design specifies a text content for display and a different corresponding audio speech content for the same message to be provided by the conversation bot. If the original language of the text content and audio speech content is different from the preferred language of the end-user, the text content of the message is separately translated to the preferred language of the end-user and the audio speech content of the message is also separately translated to the preferred language of the end-user.

The translation may be performed using a machine translation module that takes the conversation message content and an identification of its language as input and outputs the translated conversation message content to a specified target language. In some embodiments, if a direct translation between the original language and target language is not available, the conversation message content is translated to a common intermediate language that is then translated to the target language. The machine translation module may utilize rule-based, statistical, neural network-based, and/or any other translation processing to achieve the translation. The translated conversation message content may be provided to the end-user in a conversation via a text output and/or a voice output (e.g., translated text content is converted to speech output using a speech synthesizer). In some embodiments, the text message output to the end-user shows both the conversation message content in the original language as well as the translated language. Thus by showing both versions before and after the translation, the end-user is made aware that a dynamic translation has taken place. This makes the end-user aware of the possibility of potential translation errors and provides the end-user the ability to refer back to the original language version in the event of detected translation error. Thus the translation can take place for each conversation message content to be outputted by the conversation bot to the end-user during a conversation.

At 210, one or more conversation inputs from the end-user are dynamically translated from the preferred human language of the end-user to the original human language of the conversation design. For example, during the conversation the end-user provides conversation message inputs (e.g., via a text input, voice input, etc.). A choice input (e.g., selection of an item among options provided) may not need to be translated back to the original language of the conversation design, but other types of inputs such as a text input or a voice input in the preferred language of the end-user that differs from the original language of the conversation design may need to be translated to the original language to allow logic of the conversation design to function properly. For example, because the design/program specifying the underlying logic and flow for the conversation bot may expect responses from the end-user to be in the original human language of the design/program, a received response from the end-user is automatically and dynamically translated back to the original language before being passed for use in the underlying logic and flow. In some embodiments, both the translated and the original versions of the conversation input from the end-user are stored (e.g., as a record) and/or provided for use by the underlying logic or flow of the conversation design. In some embodiments, rather than assuming the conversation input from the end-user is in the preferred language of the end-user, the conversation input is analyzed to verify and/or detect its language prior to the translation. For example, the conversation input is translated from the detected language to the original language of the conversation design. If the conversation input is a voice input, speech recognition may be performed to convert the voice input to text prior to performing the translation. The translation may be performed using a machine translation module (e.g., rule-based, statistical, neural network-based, and/or any other translation processing). In some embodiments, if a direct translation is not available, the conversation input is translated to a common intermediate language that is then translated to the target original language of the conversation design. Thus the translation can take place for each appropriate conversation input from the end-user during the conversation between the end-user and the conversation bot.

In various embodiments, a conversation input is received via a voice input. For example, a microphone of an end-user device detects a voice speech of the end-user and the detected speech is processed to convert it to a text message for use in a conversation. Because speech listening and processing may be computationally expensive, voice input detection and processing is only performed when needed. A user may indicate that a voice input is being provided by holding a button (e.g., user interface button) to enable the voice input listening, and releasing the button to indicate an end of the voice input and initiate processing of the voice input. In some embodiments, an automatic listening mode listens for user speech provided as input/response without the user needing to select or release a button to indicate a start and/or end of a voice input. In some embodiments, the voice conversation between the end-user and the bot proceeds in a hands-free manner by automatically switching between voice speech modes of: listening mode, speaking mode, and processing wait mode. When the bot is to provide a message, speaking mode is entered, where a voice audio output is provided to the end-user. After the end of the voice audio output, listening mode is entered, where voice speech input listening is enabled to wait and listen for any voice speech input from the end-user. After a voice speech input is received in listening mode, processing wait mode is entered, where the received voice speech input is processed (e.g., voice listening is temporary suspended while waiting for a response from a processing service/server). A visual (e.g., wait graphic/icon, message "I am thinking . . . ", etc.) and/or audio indication is provided during the processing wait mode. In some embodiments, while the end-user is providing a voice speech input, a live speech voice text transcription of at least a portion of the voice speech input is visually shown on a user interface. For example, speech recognition is performed while the end-user is providing the voice speech input and detected words are visually shown while the end-user is providing the voice speech input.

However without a button indication, it becomes difficult to detect whether a detected silence is an end of a voice input or merely a temporary pause in the middle of the voice input. In some embodiments, when silence is detected (e.g., volume below a volume threshold, no detected word, etc.) for a dynamically variable threshold time length, voice input listening is stopped to process the voice input detected prior to the silence (e.g., contents of detected voice input prior to the stop detected and formed as a single message input). The threshold time length of silence (e.g., amount of time no voice input is detected) needed to stop the voice input listening varies based on whether a user has already started speaking (e.g., volume above a volume threshold, detected word, etc.) for a particular voice input event. For example, the threshold time length of silence is longer if the user has not started speaking (e.g., allows time for user to mentally formulate a response to a prompt in the beginning of the voice input prior to determining that the user is not going to provide a voice input) as compared to after the user has started speaking. If a non-variable threshold time length of silence is used to detect the end of the voice input, either the voice input listening may end prematurely before the user has had time to process and formulate an answer to a prompt or the voice input listening may wait too long after the end of speech of the user to end voice input listening and process the voice input. In some embodiments, an output message during a conversation is provided as a voice output (e.g., synthesized voice audio output). However, during a voice message output, a user may interrupt (e.g., stop, pause, etc.) a voice prompt/message being spoken/outputted to the user to stop/pause the voice prompt/message from being spoken/outputted (e.g., via a user interface button press/indication and/or detection of speech input of the user) to allow the user to immediately provide a response/input (e.g., voice input) without needing to wait to the end of the voice prompt/message output.

Figure 4:
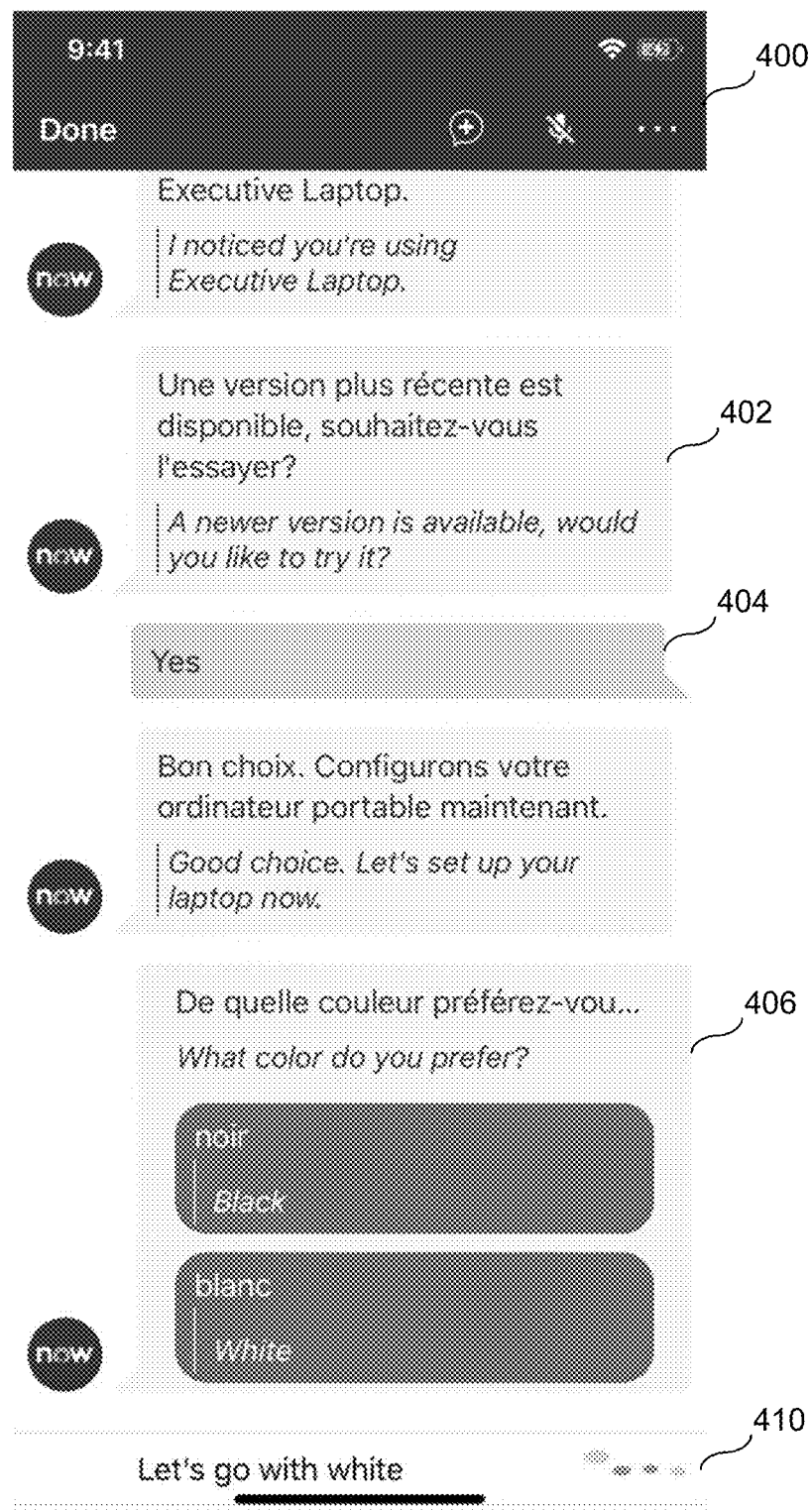
FIG. 4 is a diagram illustrating an embodiment of a user interface showing an example conversation between a conversation bot and an end-user.

FIG. 4 is a diagram illustrating an embodiment of a user interface showing an example conversation between a conversation bot and an end-user. For example, the conversation bot is utilizing the conversation design received in 202 of FIG. 2 with conversation message content specified by a designer in the French language and the conversation message content of the conversation design has been dynamically translated to the English language indicated as preferred by the end-user (e.g., using step 208 of FIG. 2).

User interface 400 displays the conversation history between the conversation bot and the end-user. The end-user is able to utilize user interface 400 to receive conversation messages from the conversation bot and provide conversation message input to the conversation bot. User interface area 410 displays a conversation message input to be provided to the conversation bot. For example, the end-user is able to type a message into user interface area 410 and/or provide a voice input that is automatically converted to text displayed in user interface area 410. In the conversation chat history shown in user interface 400, conversation message bubble 402 shows a conversation message content of the conversation design that has been provided by the conversation bot to the end-user as a message of the conversation. The message is shown both in the original language version (e.g., French version) as originally specified in the conversation design as well as in the translated version generated dynamically in the preferred language (e.g., English) of the end-user from the original language version. The translated version is visually linked and subordinated to the original language version to indicate to the end-user that it is a translation. Conversation message bubble 404 shows content of a conversation message that has been provided by the end-user to the conversation bot.

Conversation message bubble 406 shows another conversation message content of the conversation design that has been provided to the end-user as another message of the conversation. Bubble 406 corresponds to a static choice response (e.g., see FIG. 3C for an example interface that can be utilized to design it). Not only is the prompt message shown both in the original language version (e.g., French version) as originally specified in the conversation design as well as in the translated version generated dynamically in the preferred language (e.g., English) of the end-user from the original language version, the response choices are shown both in the original language versions and the corresponding dynamically translated versions. When the end-user indicates one of these choices (e.g., "white") in a response (e.g., as shown in UI area 410) in the preferred language of the end-user, the response is translated to the original language of the conversation design (e.g., to "blanc") since the conversation design has been designed to expect a response in the original language, allowing the conversation design to be utilized as-is for many different languages despite it being initially designed in only one language.

Figure 5:
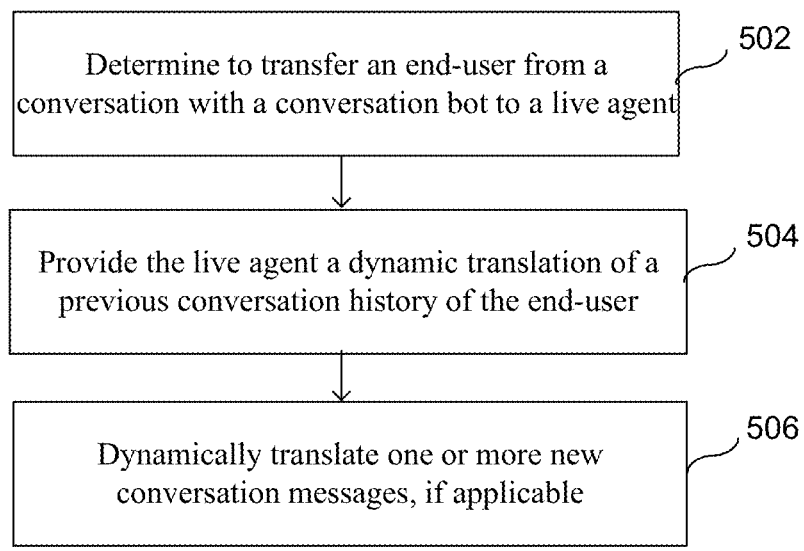
FIG. 5 is a flowchart illustrating an embodiment of a process for dynamically translating messages between an end-user and one or more live agents.

FIG. 5 is a flowchart illustrating an embodiment of a process for dynamically translating messages between an end-user and one or more live agents. The process of FIG. 5 may be implemented on service provider system 104 of FIG. 1.

At 502, it is determined to transfer an end-user from a conversation with a conversation bot to a live agent. For example, when the end-user converses with the live agent, the end-user is conversing with a human agent. The end-user may be transferred to the live agent because the end-user requested a live agent or the conversation bot may have been unable to assist the end-user, unable to understand the end-user, or the end-user requested a service or function that requires an assistance of the live agent. In some embodiments, step 502 is optional. For example, translation services are provided in a conversation/chat service that did not involve a conversation bot.

At 504, the live agent is provided a dynamic translation of a previous conversation history of the end-user. For example, the live agent may only fluently understand a language (e.g., French) that is different from a preferred language (e.g., English) of the end-user. If the live agent has been inserted into a middle of an existing conversation that the end-user was having with a conversation bot and/or another live agent, the live agent may need to understand the previous conversation history. However, if the live agent doesn't understand the original language(s) of the messages from the conversation bot, the end-user, or other live agent, the live agent is unable to understand and review the previous messages. Thus the live agent is provided translations of the messages of the conversation history from the original language(s) to the preferred language of the live agent, if the original language of the message is different from the preferred language of the live agent. For example, the view of the conversation history shows messages in its original language with corresponding translations for any message in an original language that is not the preferred language. This message history view can be different for different conversation parties due to different corresponding translations being shown for different preferred languages of the different communication parties. For example, although every communication party is shown the messages in their original languages prior to any translation, any message that is not in the preferred language of the communication party is notated with a translated version that may differ for different parties depending on their preferred language.

In some embodiments, the conversation may involve more than one live agent or more than one end-user. For example, a live agent may involve another supervisory live agent to participate in the same conversation at the same time with the end-user. Because these communication parties may speak different languages from each other, previous messages as well as new messages are automatically translated to the appropriate preferred language of the communication party if a received message is determined to be not already in the preferred language. Identification of the original language of the message may be determined automatically by analyzing the message and/or determined based on a profile, a specification, or other information associated with the party that provided the message.

In some embodiments, the determination of language preference is made based on profile information and/or another stored preference of the communication party. For example, the party may have specified a preferred language in a stored user profile. In some embodiments, the determination of language preference is made based on a detected location of the party. For example, a location information of the party is detected (e.g., based on IP address, provided location coordinate, stored location in a user profile, etc.) and a most common, default, and/or national language corresponding to the location is determined as the preferred language of the party. In some embodiments, the determination of language preference is made based on conversation message content from the party. For example, the party may indicate during a conversation that the party prefers to converse in a specified language or that the party doesn't understand or speak the current language being utilized. In some embodiments, a preferred language of a communication party is automatically detected by analyzing a message content provided by the party in the preferred language (e.g., using a language detection service).

At 506, one or more new conversation messages are dynamically translated, if applicable, between communication parties. For example, when a new message is communicated by a communication party, the message is translated from the original language of the message to a preferred language for each recipient, if different.

If the message is a voice input, speech recognition may be performed to convert the voice input to text prior to performing the translation. The translation may be performed using a machine translation module (e.g., rule-based, statistical, neural network based and/or any other translation processing). In some embodiments, if a direct translation is not available, the message is translated to a common intermediate language that is then translated to the desired preferred language. In some embodiments, the voice output, if to be provided, corresponding to the message is provided using the translated message in the preferred language of the recipient. In some embodiments, the text output of the message is shown to each communication party in the original language version as well as the translated version in the specific preferred language for each communication party. Thus by showing both versions before and after translation, the communication party is made aware that a dynamic translation has taken place. For example, in an example of communication between an English language preferred end-user and a first live agent preferring French language and a second live agent preferring Japanese language, a message from the end-user in English is shown in both English and French for the first live agent and shown in both English and Japanese for the second live agent.

Figure 6A:
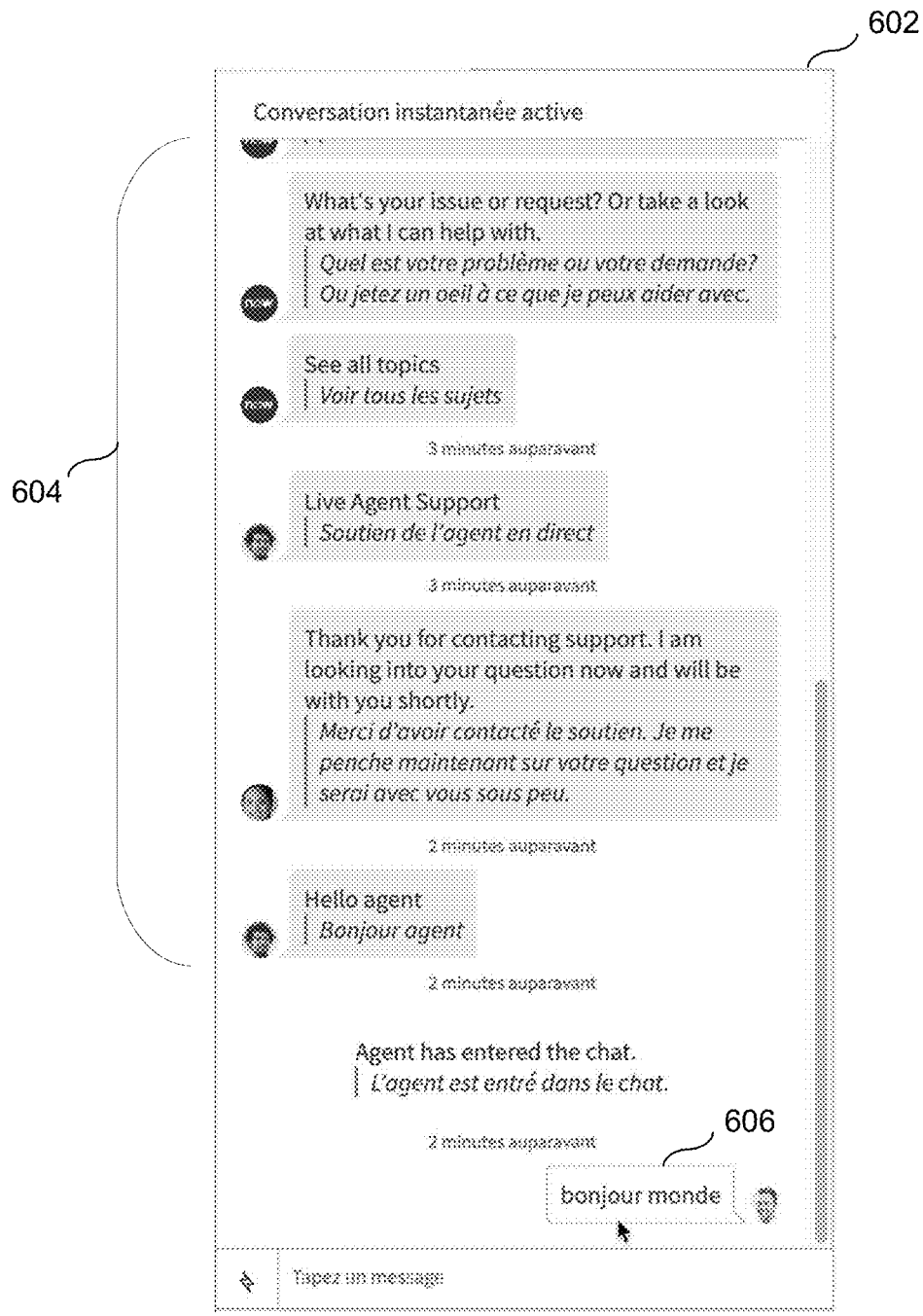
FIGS. 6A-B are diagrams illustrating an embodiment of user interfaces showing an example conversation between live agents and an end-user.
Figure 6B:
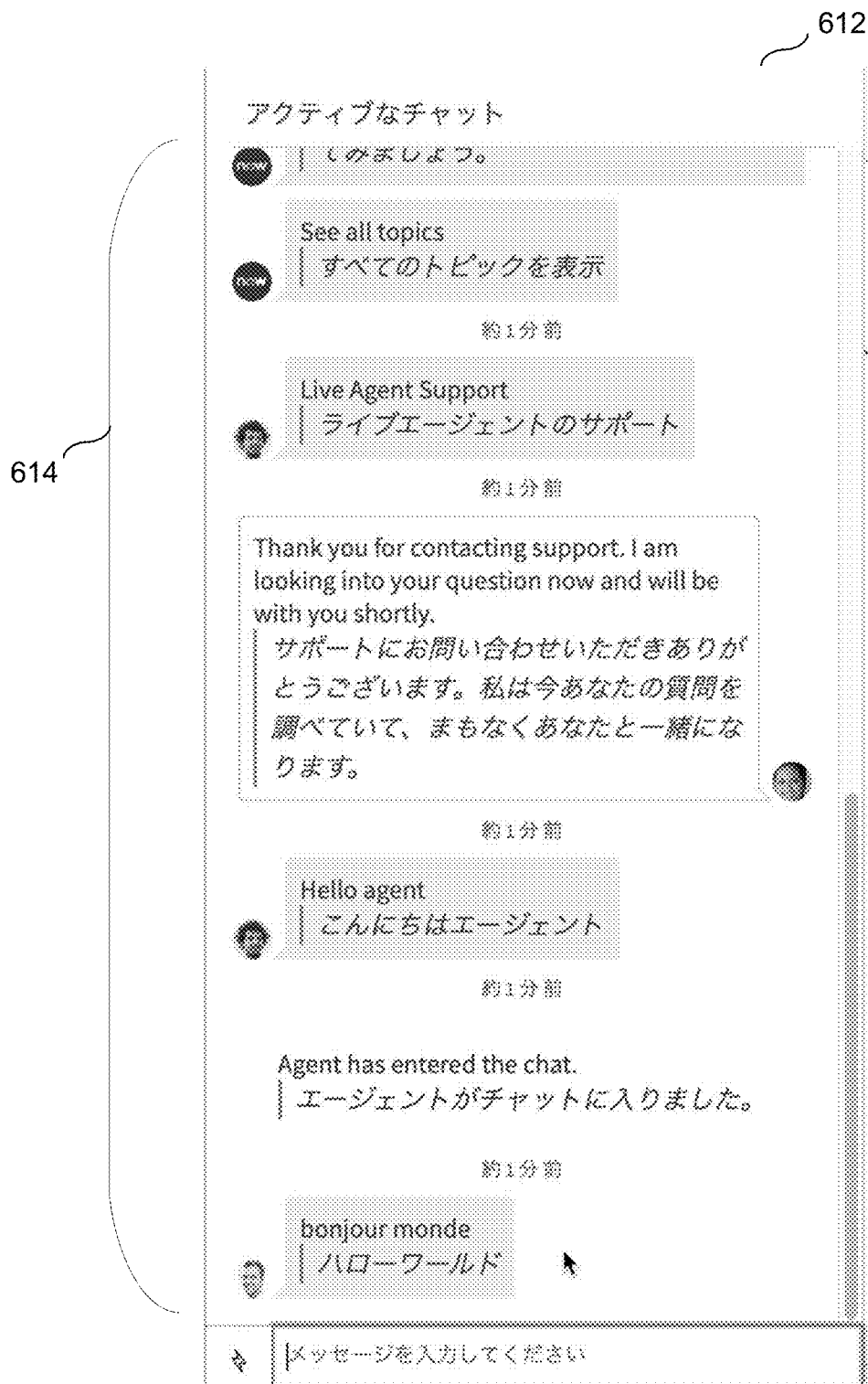

FIGS. 6A-B are diagrams illustrating an embodiment of user interfaces showing an example conversation between live agents and an end-user. For example, FIGS. 6A-B illustrate an example of the translations performed using at least a portion of the process of FIG. 5.

User interface 602 of FIG. 6A displays the conversation history for a first live agent of the conversation. The first live agent is able to utilize user interface 602 to view previous conversation history and receive conversation messages from other communication parties as well as provide a new conversation message for the other communication parties. Because the first live agent preferred to communicate in French, previous messages 604 in the conversation (e.g., in English) are also shown with corresponding French translations. The translated version is visually linked and subordinated to the original language version to indicate to the first agent that it is a translation. The first live agent has provided message 606 to the other communication parties. Because this message is from the first live agent and in the preferred language of the first live agent, a translation is not necessary and not shown.

User interface 612 of FIG. 6B displays the conversation history for a second live agent of the conversation. The second live agent is able to utilize user interface 612 to view previous conversation history and receive conversation messages from other communication parties as well as provide a new conversation message for the other communication parties. Because the second live agent preferred to communicate in Japanese, previous messages 614 in the conversation (e.g., in English and in French) are also shown with corresponding Japanese translations. The translated version is visually linked and subordinated to the original language version to indicate to the first agent that it is a translation. As shown in FIGS. 6A and 6B, different communications with different preferred languages are shown only the appropriate translations in the corresponding preferred language, as applicable.

Figure 7:
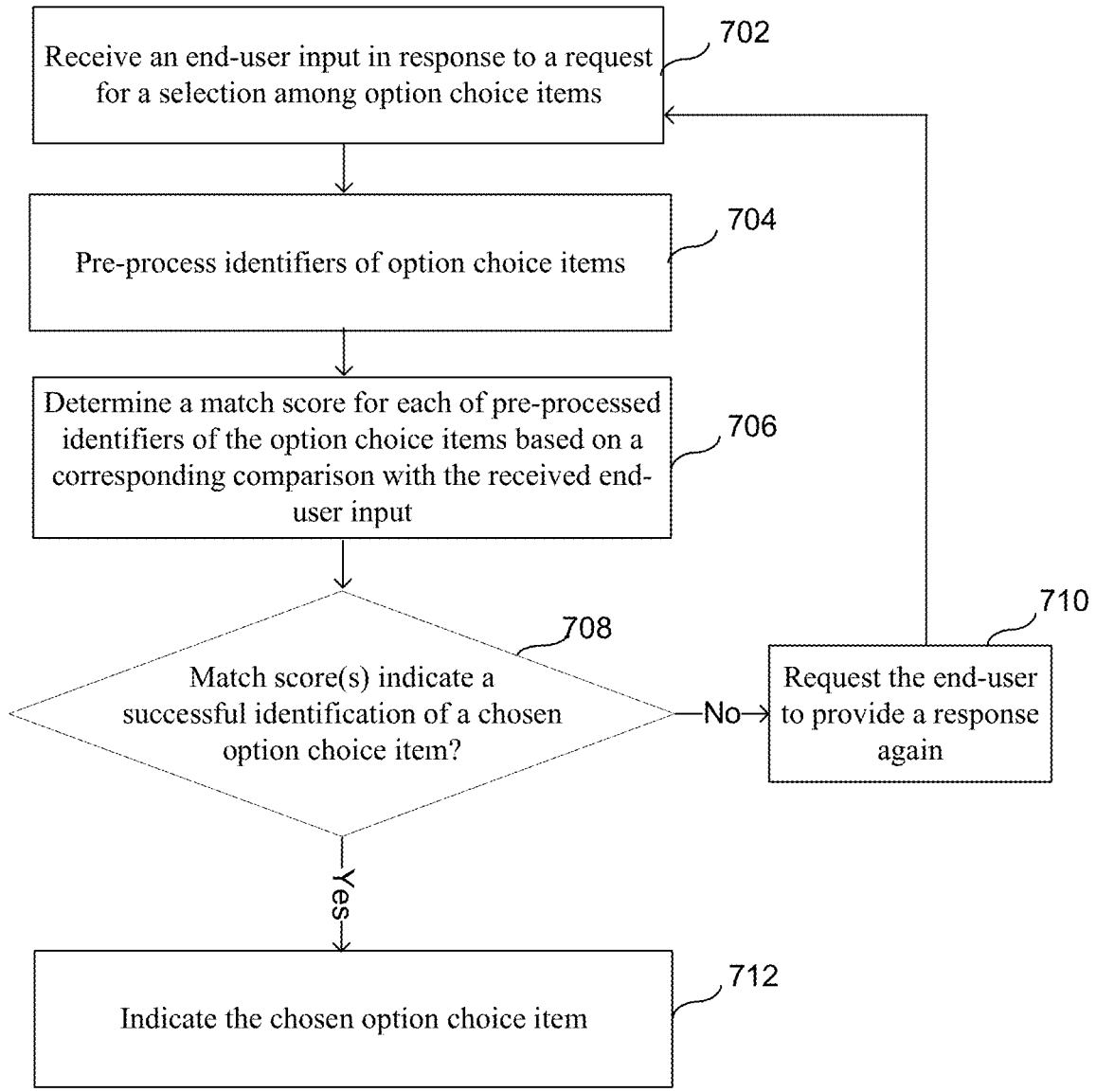
FIG. 7 is a flowchart illustrating an embodiment of a process for determining a selected option choice item from a user provided input.

FIG. 7 is a flowchart illustrating an embodiment of a process for determining a selected option choice item from a user provided input. The process of FIG. 7 may be performed at least in part by service provider system 104 of FIG. 1.

At 702, an end-user input is received in response to a request for a selection among option choice items. In some embodiments, the request was provided as a message to an end-user that asks the end-user to select one item among the listed option choice items. For example, as previously discussed in conjunction with the example of FIG. 3C, a type of input that can be requested from an end-user is a static choice response. For example, a conversation bot lists predefined choices and an end-user can select one item from the choice list. The provided request and/or the list of the option choice items is provided to the end-user in a version translated to the preferred language of the end-user from the original language version specified in a conversation design or other content. The list of the possible option choice items in the original language may also be provided to show the end-user the original version from which the translation was performed. The end-user input may be a text input and/or a voice input. To enable character-based analysis, audio of the voice input may be converted to a text version (e.g., via speech recognition) for use as the end-user input. In some embodiments, if applicable, the end-user input is translated to an original language utilized to specify the option choice items in a conversion design (e.g., performed in 210 of FIG.

2). In some embodiments, the end-user input is pre-processed to standardize and/or filter out non-meaningful content for option choice identification/matching. For example, the text version of the end-user input is processed to convert all characters to lower case, remove special characters (e.g., non-alphanumeric characters), remove double spaces, and/or remove article words, etc.

At 704, identifiers of the option choice items (e.g., choices from date-time choices, Boolean choices, static choices, reference choices, carousel choices, etc.) are pre-processed. For example, the specified text identifier for each option choice is pre-processed to standardize and/or filter out non-meaningful content for option choice identification/matching. In some embodiments, the text identifier for each option choice is processed to convert all characters to lower case, remove special characters (e.g., non-alphanumeric characters), remove double spaces, etc. The option choice item pre-processing may be performed for a translation version of the option choice items (e.g., in the translated language matching the preferred language of the end-user specified to provide the end-user input) and/or the original language version of the option choice items (e.g., as specified in the conversion design). For example, although the end-user is likely going to identify a chosen item among the option choice items in the preferred language of the end-user, the end-user may identify the chosen item in the original untranslated language of the option choice items, the original language version of the identifiers of the option choice items may also be pre-processed for possible matching to the received end-user input if the original language is different from the preferred language of the end-user.

At 706, a corresponding match score for each of the pre-processed identifiers of the option choice items are determined based on a corresponding comparison associated with the received input. For example, the pre-processed text version of the received end-user input is compared with the pre-processed identifier of each option choice item. In some embodiments, if the pre-processed text version of the received end-user input completely matches one of the pre-processed identifiers for an option choice item, that option choice item is selected as the selected option choice item and the process automatically proceeds to 712. In some embodiments, determining the match score includes comparing each word (e.g., characters delimited by a space) in the pre-processed text version of the received end-user input with the pre-processed identifier of each option choice item. For example, if a word in the pre-processed text version of the received end-user input exactly matches any word in the pre-processed identifier of an option choice item, the match score for this option choice item is increased (e.g., add one to the match score).

Partial matching may be allowed for numeric words because the end-user may choose to identify a long sequence of numbers included in an option choice item by only identifying some of the unique digits in the long sequence of numbers. For example, if a word containing an alphabetic character in the pre-processed text version of the received end-user input exactly matches any word in the pre-processed identifier of an option choice item, the match score for this option choice item is increased (e.g., add one to the match score), and if a word containing only numeric characters in the pre-processed text version of the received end-user input is included in any word in the pre-processed identifier of an option choice item, the match score for this option choice item is increased (e.g., add one to the match score). In one specific example, the option choice items are "inc0000054," "inc0009005," and "inc0007001" and when the end-user provides input "0054," the score for the "inc0000054" item is increased because the end-user input is included in it.

In some embodiments, n-gram character matching is performed in determining the corresponding match score for each of the option choice items. For example, a list of every two consecutive character combinations in the pre-processed text version of the received end-user input is generated and a separate list of every two consecutive character combinations in the pre-processed identifier for each of the option choice items is generated. In this example, the corresponding match score for each of the option choice items is based on the number of two consecutive character combinations in the pre-processed text version of the received end-user input matching the two consecutive character combinations in the corresponding option choice item.

In some embodiments, the pre-processed identifier utilized for each of the option choice items is based on a translated version that has been translated to the preferred language of the end-user (e.g., translated in 208 of FIG. 2) from a different original language version. In some embodiments, in the event that none of the pre-processed translated identifiers for the option choice items match the pre-processed text version of the received end-user input, the corresponding match score for each of the option choice items is determined based on the original language version of the identifiers of each option choice item. For example, although the end-user is likely going to identify a chosen item among the option choice items in the preferred language of the end-user, the end-user may identify the chosen item in the original untranslated language of the option choice items, the original language version of the identifiers of the option choice items are utilized in determining the match scores for the option choice items in the comparisons associated with the received input if the translated identifiers for the option choice items do not yield a match (e.g., match scores are zero or no single match score is greater than other match scores). In an alternative embodiment, the match scores are determined based on a translated version of the received input (e.g., translated to original language of the option choice items) and an original language version of the identifiers of the option choice items.

At 708, it is determined whether the match score(s) indicate a successful identification of a chosen option choice item by the end-user. For example, it is determined whether there exists a match score for an option choice item that is not zero, and if there are other option choice items, that the match score is greater than other match scores for other option choice items (if there are other option choice items). The option choice item corresponding to the greatest match score that is not zero is selected as the chosen option choice item indicated by the received end-user input. If the match score(s) do not indicate a successful identification of a selected option choice item by the end-user (e.g., no non-zero match score or no single match score that is greater than other match scores), the process proceeds to 710 where the end-user is requested to provide a response again. For example, if there exists multiple option choice items that equally match the received end-user input or no match has been identified, the end-user is requested to rephrase and/or provide another input and the process proceeds to 702 where a new response is received and the process is repeated. If the match score(s) do indicate a successful identification of a chosen option choice item by the end-user, the process proceeds to 712.

At 712, the chosen option choice item is indicated. For example, the chosen option choice item is utilized as the end-user chosen option choice item in a conversation flow, script, and/or code. This chosen option choice item may be recorded in a database/storage. In some embodiments, the chosen option choice item is indicated to the end-user. For example, the end-user is provided a message indicating and/or confirming the chosen option choice item. If the chosen item is not what the end-user intended, the end-user may provide a message to that effect (e.g., provide a message: "No, that is not what I selected") which causes the identified chosen item to be no longer the chosen item and the process may proceed to 710.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
    receiving data indicative of one or more inputs of an end-user directed to a user interface of a conversation designer tool;
    determining a conversation design based on the data, wherein the conversation design enables a conversation bot to provide a service to the end-user using a conversation flow specified at least in part by the conversation design, wherein the conversation design specifies in a first human language at least a portion of a message content to be provided by the conversation bot during an execution of the conversation flow, wherein the conversation design specifies an element in a further user interface requesting input from the end-user, and wherein the input specifies a second human language different from the first human language; and
    dynamically translating for the end-user, the message content of the conversation design in the first human language from the first human language to the second human language, wherein the dynamic translation from the first human language to the second human language is performed using a machine translator after deploying the conversation design in the first human language, and wherein the message content translated to the second human language is visually indicated in the further user interface as a translation of the conversation bot conversing in the first human language that is different than the second human language.

2. The method of claim 1, wherein the conversation design is deployed with the message content only prespecified in the first human language.

3. The method of claim 1, wherein the message content from the conversation bot is provided to the end-user as a text message.

4. The method of claim 1, wherein the message content from the conversation bot is provided to the end-user as a voice synthesized audio message.

5. The method of claim 4, further comprising, in response to an indication from the end-user, stopping an audio output of the voice synthesized audio message prior to entire completion of the audio output of the voice synthesized audio message.

6. The method of claim 1, wherein the message content from the conversation bot includes a plurality of response options presented visually as selectable within the message content and each of the response options is provided both in the second human language and in the first human language visually together in a same chat message bubble from the conversation bot.

7. The method of claim 1, further comprising:
    in response to a determination that the message content is to be provided by the conversation bot to a second end-user associated with a third human language, dynamically translating for the second end-user, the message content of the conversation design from the first human language to the third human language, wherein the dynamic translation from the first human language to the third human language is performed using the machine translator.

8. The method of claim 1, further comprising at least one of the following:
    (a) automatically switching between voice speech modes of: listening mode, speaking mode, and processing wait mode;
    (b) providing a live voice speech transcription of at least a portion of a voice speech input while the end-user is providing the voice speech input; or
    (c) receiving a voice speech input from the end-user and automatically determining that the voice speech input has ended based on a detection of silence for a dynamically selected threshold amount of time.

9. The method of claim 1, wherein the message content specifies a first portion to be provided as a text content portion of the message content and a second portion to be provided as an audio speech portion of the message content, translating the message content includes separately translating the first portion from the second portion, and providing the message content to the end-user includes providing the translated first portion as a text output and providing the translated second portion as an audio speech output associated with the text output.

10. The method of claim 1, further comprising providing to a first live agent a translation in a third human language of previous messages between the conversation bot and the end-user.

11. The method of claim 1, further comprising receiving a second new message from a first live agent in a third human language, translating the second new message from the third human language to the second human language, and providing the end-user the translation of the second new message in the second human language.

12. The method of claim 11, wherein the translated second new message is provided to the end-user as a voice synthesized audio message using a voice persona that is different from a previous voice persona utilized to provide the message content from the conversation bot.

13. The method of claim 1, further comprising:
    receiving a voice speech input from the end-user in response to a request for a selection among option choice items;
    processing identifiers of the option choice items;
    determining a corresponding match score for each of the processed identifiers of the option choice items based on a corresponding comparison associated with the voice speech input; and
    identifying one of the option choice items as a chosen option choice item based on the match scores.

14. The method of claim 13, wherein the processing identifiers of the option choice items includes performing a translation from the first human language to the second human language.

15. The method of claim 13, wherein the comparison associated with the voice speech input allows partial matching for a numerical word of the voice speech input.

16. A system comprising:
one or more processors configured to:
receive data indicative of one or more inputs of an end-user directed to a user interface of a conversation designer tool; determine a conversation design based on the data, wherein the conversation design enables a conversation bot to provide a service to the end-user using a conversation flow specified at least in part by the conversation design, wherein the conversation design specifies in a first human language at least a portion of a message content to be provided by the conversation bot during an execution of the conversation flow, wherein the conversation design specifies an element in a further user interface requesting input from the end-user, and wherein the input specifies a second human language different from the first human language; and
dynamically translate for the end-user, the message content of the conversation design in the first human language from the first human language to the second human language, wherein the dynamic translation from the first human language to the second human language is performed using a machine translator after deploying the conversation design in the first human language, and wherein the message content translated to the second human language is visually indicated in the further user interface as a translation of the conversation bot conversing in the first human language that is different than the second human language of the end-user; and
a memory coupled to at least one of the one or more processors and configured to provide at least one of the one or more processors with instructions.

17. The system of claim 16, wherein the conversation design is deployed with the message content only prespecified in the first human language.

18. The system of claim 16, wherein the message content from the conversation bot is provided to the end-user as a text message.

19. The system of claim 16, wherein the message content from the conversation bot is provided to the end-user as a voice synthesized audio message.

20. A computer program product, the computer program product being embodied in a non-transitory computer readable storage medium and comprising computer instructions for:
receiving data indicative of one or more inputs of an end-user directed to a user interface of a conversation designer tool; determining a conversation design based on the data, wherein the conversation design enables a conversation bot to provide a service to the end-user using a conversation flow specified at least in part by the conversation design, wherein the conversation design specifies in a first human language at least a portion of a message content to be provided by the conversation bot during an execution of the conversation flow, wherein the conversation design specifies an element in a further user interface requesting input from the end-user, and wherein the input specifies a second human language different from the first human language; and
dynamically translating for the end-user, the message content of the conversation design in the first human language from the first human language to the second human language, wherein the dynamic translation from the first human language to the second human language is performed using a machine translator after deploying the conversation design in the first human language and wherein the message content translated to the second human language is visually indicated in the further user interface as a translation of the conversation bot conversing in the first human language that is different than the second human language of the end-user.

* * * * *